(12) United States Patent
Doumit

(10) Patent No.: US 10,800,669 B2
(45) Date of Patent: Oct. 13, 2020

(54) SYSTEMS AND METHODS FOR REMOVING GAS FROM A LIQUID

(71) Applicant: George Doumit, Exeter, NH (US)

(72) Inventor: George Doumit, Exeter, NH (US)

( * ) Notice: Subject to any disclaimer, the term of this patent is extended or adjusted under 35 U.S.C. 154(b) by 124 days.

(21) Appl. No.: 15/730,594

(22) Filed: Oct. 11, 2017

(65) Prior Publication Data

US 2018/0162745 A1    Jun. 14, 2018

Related U.S. Application Data

(60) Provisional application No. 62/431,566, filed on Dec. 8, 2016.

(51) Int. Cl.

| B01D 19/00 | (2006.01) |
|---|---|
| C02F 1/20 | (2006.01) |
| C02F 7/00 | (2006.01) |
| B01F 3/04 | (2006.01) |
| B01F 5/04 | (2006.01) |
| B01F 5/00 | (2006.01) |
| C02F 101/00 | (2006.01) |

(52) U.S. Cl.
CPC ............... *C02F 1/20* (2013.01); *B01D 19/00* (2013.01); *B01D 19/0005* (2013.01); *B01D 19/0042* (2013.01); *B01D 19/0063* (2013.01); *B01F 3/04099* (2013.01); *B01F 5/04* (2013.01); *C02F 7/00* (2013.01); *B01F 2005/0008* (2013.01); *C02F 2101/006* (2013.01); *C02F 2201/002* (2013.01)

(58) Field of Classification Search
CPC .................. C02F 1/20; C02F 2101/006; C02F 2201/002; B01D 19/00; B01D 19/0005; B01D 19/0042; B01D 19/0063; B01F 3/0499; B01F 5/04; B01F 2005/0008; C01F 7/00
USPC .................................................... 95/241–266
See application file for complete search history.

(56) References Cited

U.S. PATENT DOCUMENTS

| 4,412,924 | A | * | 11/1983 | Feather | ...................... | C02F 1/78 |
|---|---|---|---|---|---|---|
| | | | | | | 210/123 |
| 5,045,215 | A | * | 9/1991 | Lamarre | ............ | B01D 19/0005 |
| | | | | | | 210/747.7 |
| 5,478,507 | A | * | 12/1995 | Bros | ...................... | B01D 3/163 |
| | | | | | | 261/114.1 |
| 2013/0061944 | A1 | * | 3/2013 | Tarantino | ................ | E03B 1/042 |
| | | | | | | 137/101.27 |
| 2014/0116962 | A1 | * | 5/2014 | Punzo | ...................... | C02F 1/325 |
| | | | | | | 210/748.11 |

* cited by examiner

*Primary Examiner* — T. Bennett McKenzie

(57) ABSTRACT

A system for removing a gas from a liquid comprises an aeration tank for aerating a raw liquid containing a gas to remove the gas by causing an agitated air flow through the liquid. A plurality of aeration plates placed substantially horizontally across the horizontal cross sectional plane of the tank, the aeration plates perforated by a plurality of openings. Aerating the liquid occurs with the liquid flowing downward into the aeration tank, and an airflow flowing upward through the liquid from a point proximate to the bottom of the aeration tank, wherein the aeration plates are configured to impart a crisscross movement pattern in the liquid flow down and the airflow up as each passes the other to agitate and mix the flow of liquid and air.

2 Claims, 2 Drawing Sheets

SYSTEMS AND METHODS FOR REMOVING GAS FROM A LIQUID

CROSS-REFERENCE TO RELATED APPLICATION(S)

This application claims priority from U.S. Provisional Application 62/431,566 filed Dec. 16, 2016, which is incorporated herein.

BACKGROUND OF THE INVENTION

1. Field of Invention

The disclosure relates to systems and methods for removing a gas (e.g., radon) from a liquid (e.g., water from a well).

2. Description of Related Art

Radon-contaminated ground water is quite common, and it is desirable to remove radon from water before drinking. In one aspect, a system for removing a gas (e.g., radon) from a liquid (e.g., well water) includes a first tank for aerating raw water from the well to remove the radon, and a second tank for at least temporarily storing the aerated (substantially radon-free) water prior to being delivered into a house's water distribution system.

In a typical implementation, the system has a raw water input valve that is configured to control the flow of raw water (e.g., the well water) into the system, and a purely mechanical, differential float system inside the second (temporary storage) tank and configured to control the raw water input valve. In a typical implementation, the differential float system may include a float that is configured to move or slide up or down a line depending on the fluid level in the second (temporary storage) tank between an upper stop and a lower stop. Generally speaking, in a typical implementation, the differential float system may be operable to cause the valve to open when the float contacts the lower stop, and to close when the float contacts the upper stop. In a typical implementation, the positions of the stops along the line, for example, may be adjustable.

In some implementations, the first tank (for aerating the raw water) is configured so that the water and air flow in opposite directions through a plurality of perforated aeration plates that have openings or passages configured to agitate the water and air which encourages mixing (e.g., by imposing a crisscross type of motion to the water and air).

In a typical implementation, one or both of the tanks may have easy-to-open, pry-off lids with substantially unobstructed access—for easy maintenance (e.g., cleaning).

In some implementations, one or more of the following features and/or advantages are present.

For example, some significant features of the systems and techniques disclosed herein may include 1) an electric free tank fill-up system, 2) a two-tank system (to physically separate aeration or radon-removal functions from temporary storage of aerated, radon-free water storage) or a one-tank system, 3) a high flow rate aeration system, 4) an easy-to-operate system, and/or 5) an easy-to-maintain system.

Each of these possible features is discussed below in the paragraphs that follow.

In some implementations, the system has an electric-free tank fill functionality. In some implementations, the system(s) disclosed herein can include a mechanical fill system to keep operation simple, using a differential adjustable fill valve assembly that accommodates system design integrity by diverting water from a finished water tank to an aeration tank, to then return to the finished water tank.

With regard to the two-tank system feature, in some implementations, the system(s) disclosed herein may be designed to aerate radon in a separate tank from the finished (aerated) water tank via air blower. This type of design may enable the blower to run for an extended period after water flow has been stopped; this type of design may help flush any radon gas accumulated from the aeration process and replace it with fresh air.

In some implementations, the finished (aerated) water storage tank can be filled up to about 4 inches from the top, because radon is being aerated in a separate tank. This can be quite advantageous particularly when compared to single tank designs, where the water fill line may be limited to the middle of the of tank or lower due to the aeration/agitation that needs to take place in the same tank.

With regard the high flow rate aeration system feature, water and air flow in the aeration/separation tank may be in a crisscross flow pattern. This type of design may allow for a high water flow rate into the aeration tank, water flow from top of tank downward to finish product tank and air flow from bottom of tank upward to be exhausted outside of building. A crisscross flow pattern can create a high level of radon removal from water, as the air flows upward and the water flows downward through the tank. This type of interaction can cause the water to tumble and agitate rapidly for a very high level of radon gas removal.

The system(s) disclosed herein are generally easy to operate. In some implementations, for example, because the system design is based on a mechanical float valve fill system, the operation is very simple.

Moreover, in some implementations, the tank color (e.g., of the aerated water storage tank) is milky white allowing one to see the water level inside. This may help a person determine whether the differential float valve is operating properly. Other systems on market operate by utilizing level switch and solenoid valves, in case of equipment failure the system will overflow, there's no way to know the level inside them because they are dark colored tanks.

In some implementations, the system(s) disclosed herein are very easy to maintain. In this regard, the systems make it easy to home owner/consumer to get tank cleaned. The aerated water storage tank, for example, may include an easy removal pry-off lid that requires no disassembly or special tools to open the tank and get it cleaned. This can be contrasted with other systems on market, which require some type of disassembly of equipment or the removing of vent pipes from top of tank or work around aeration piping systems installed inside the tank, for example.

Moreover, in a typical implementation, any components (e.g., the control box) that end up being placed atop the aerated water storage tank, for example, are minimal and small and can be easily positioned so that they do not obstruct easy access to (and easy removal of the pry-off lid.

Other features and advantages will be apparent from the description and drawings, and from the claims.

Note, although the invention described herein will primarily discuss the invention in relation to water and radon gas, it is equally applicable to other liquids/fluids and gases, and references to "water" and "radon" should be viewed as primarily generic terms.

Based on the foregoing, there is a need in the art a system, which will facilitate easy and economical removal of radon from well water.

SUMMARY OF THE INVENTION

A system to remove a gas from a liquid comprised of an aerating tank aerating a liquid containing a gas to remove the gas by causing an air flow through the liquid and temporarily storing the aerated liquid prior to being delivered into a liquid distribution system. Aerating the liquid uses a liquid flow flowing downward into the aerating tank, and an air flow upward through the liquid in the aerating, with the liquid flow and the airflow having a crisscross movement pattern past each other.

A liquid input valve configured to control the flow of the liquid into the system, and a purely mechanical, differential float system configured to control the liquid input valve.

The differential float system comprises a float configured to move or slide up or down a line depending on level of liquid between an upper stop and a lower stop, wherein the differential float system operates to open the valve when the float contacts the lower stop and operates to close the valve when the float contacts the upper stop.

The positions of the stops along the line are adjustable.

The aerating tank is configured so liquid and air flow in opposite directions through a plurality of perforated aeration plates, arranged horizontally in the aerating tank, having openings or passages configured to agitate the liquid and air to mix the liquid and air by imposing the crisscross pattern of movement to the liquid and air.

The aerating tank comprises an easy-to-open, pry-off lid with substantially unobstructed access for easy maintenance.

The system further comprises a second storage tank for storing aerated water with gas substantially removed.

A liquid input valve configured to control the flow of the liquid into the system, with a purely mechanical, differential float system inside the second storage tank configured to control the liquid input valve.

A system removing a gas from a liquid comprises an aeration tank for aerating a raw liquid containing a gas to remove the gas by causing an agitated air flow through the liquid. A plurality of aeration plates placed substantially horizontally across the horizontal cross sectional plane of the tank, the aeration plates perforated by a plurality of openings. Aerating the liquid occurs with the liquid flowing downward into the aeration tank, and an airflow flowing upward through the liquid from a point proximate to the bottom of the aeration tank, wherein the aeration plates are configured to impart a crisscross movement pattern in the liquid flow down and the airflow up as each passes the other to agitate and mix the flow of liquid and air.

A raw liquid input valve configured to control the flow of the raw liquid into the system, and a purely mechanical, differential float system inside the tank configured to control the raw liquid input valve.

The differential float system comprises a float configured to move or slide up or down a line depending on level of liquid in the tank between an upper stop and a lower stop, wherein the differential float system operates to open the valve when the float contacts the lower stop and operates to close the valve when the float contacts the upper stop.

The positions of the stops along the line are adjustable.

The tank comprises and easy-to-open, pry-off lid with substantially unobstructed access for easy maintenance.

The liquid comprises water and the gas comprises radon.

A method removing a gas from a liquid, comprising the steps of aerating a raw liquid containing a gas to remove the gas by causing an agitated air flow through the liquid in an aeration tank. Using a plurality of aeration plates placed substantially horizontally across the horizontal cross sectional plane of the tank to aerate the liquid, with the aeration plates perforated by a plurality of openings. Flowing the liquid downward into the aeration tank, and flowing the air upward through the liquid in the aeriation tank. The aeriation plates configured to impart a crisscross movement pattern in the liquid flow down and the airflow up as each passes the other to agitate and mix the flow of liquid and air. Venting extracted gas out of the aeration tank.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Figure 1:
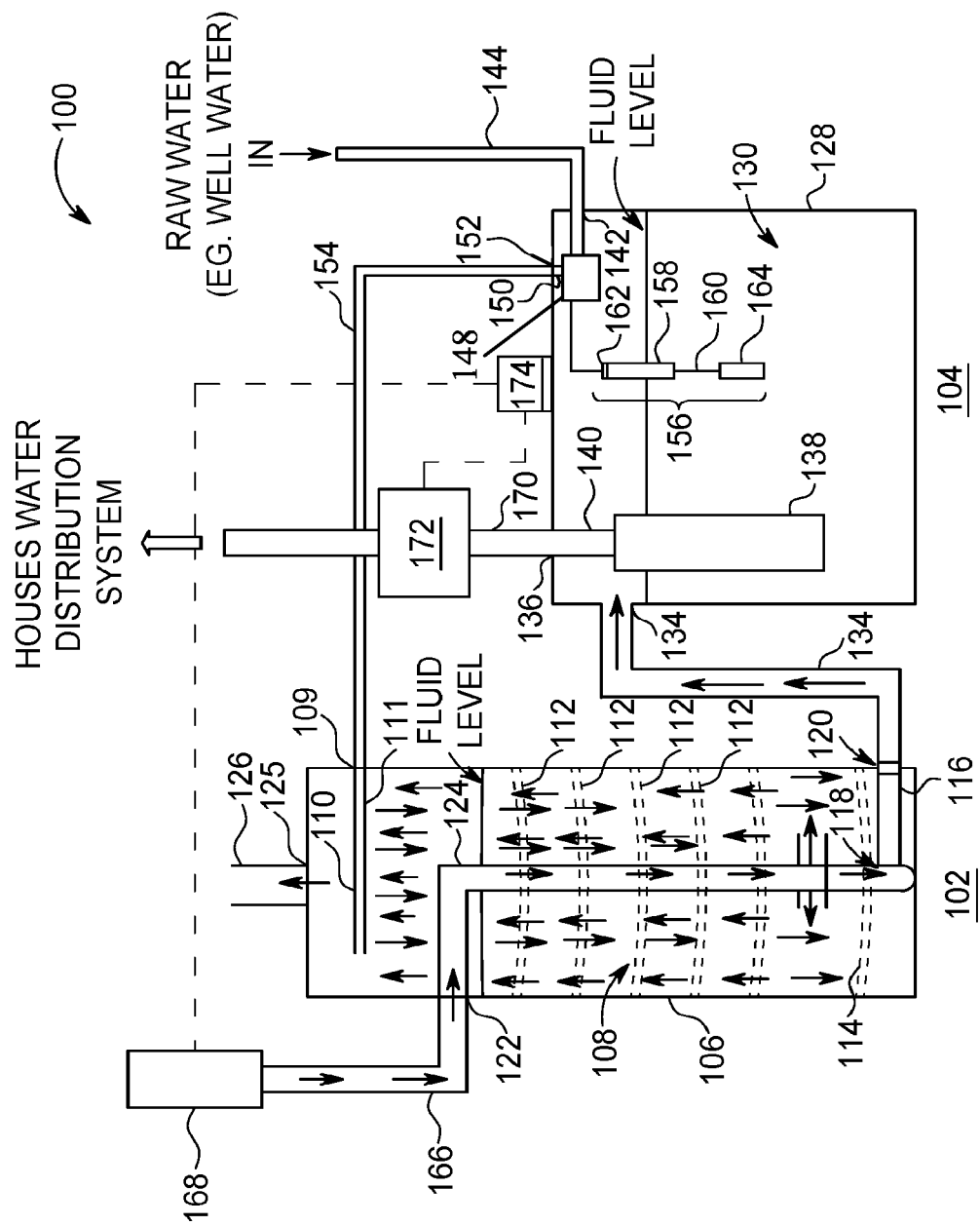
FIG. 1 is a schematic representation of a two-tank system for removing gas (e.g., radon) from a liquid (e.g., well water), according to an embodiment of the present invention.
Figure 2:
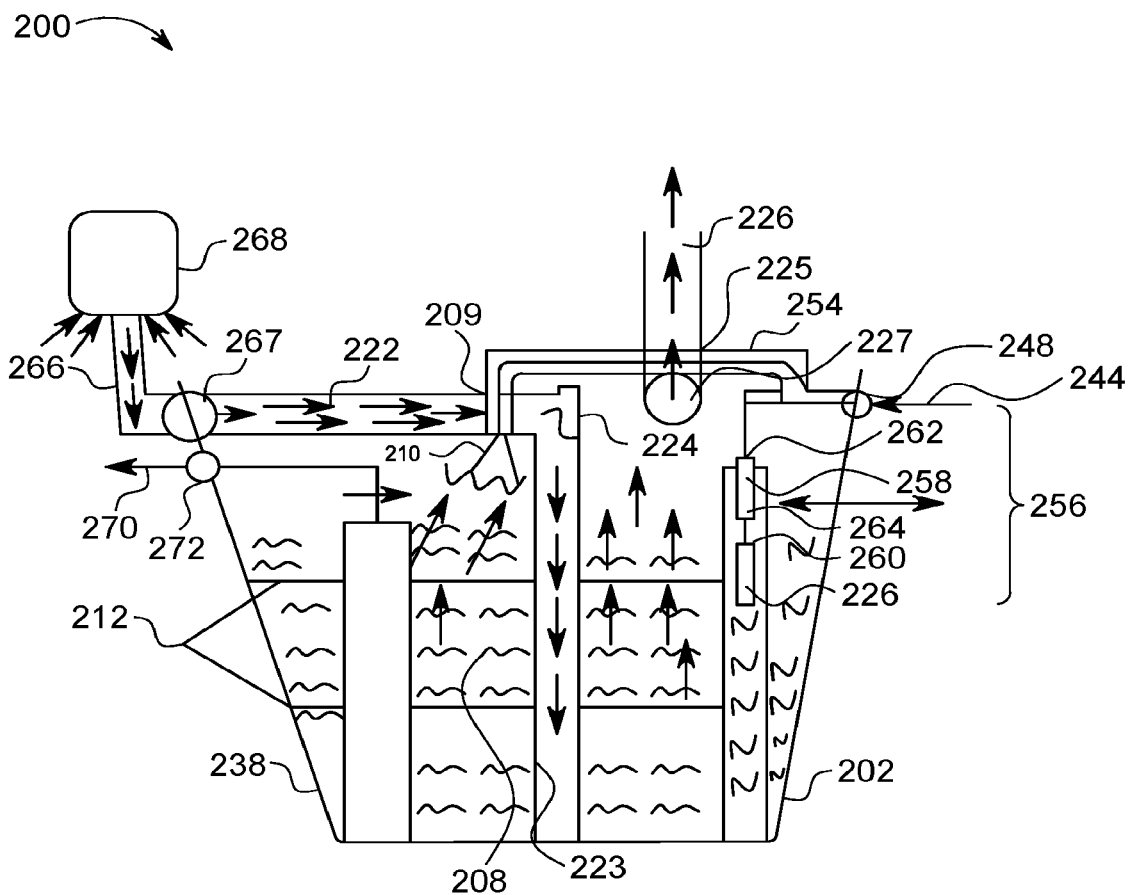
FIG. 2 is a schematic representation of a one-tank system for removing gas (e.g., radon) from a liquid (e.g., well water), according to an embodiment of the present invention.

Preferred embodiments of the present invention and their advantages may be understood by referring to FIGS. 1-2, wherein like reference numerals refer to like elements.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Headings provided herein are for convenience and are not to be taken as limiting the disclosure in any way.

The enumerated listing of items does not imply that any or all of the items are mutually exclusive, unless expressly specified otherwise.

The terms "a", "an" and "the" mean "one or more", unless expressly specified otherwise.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

The present invention will now be described in detail with reference to embodiments thereof as illustrated in the accompanying drawings.

FIG. 1 depicts a schematic diagram of a system 100 configured to remove radon from water supplied, for example, from a well into a house. Gas removing system 100 depicted uses two tank; 1) an aeration tank 102, and 2) a separate aerated water tank 104 for storing aerated water (although alternatively the separate aerated water storage tank can be eliminated in a one-tank system).

In general terms, the aeration tank 102 can be configured to aerate the water for purposes of removing radon (or other gases), and the aerated water tank 104 can be configured to temporarily store the water after the radon has been removed and to deliver the stored water into the house's water distribution system.

The aeration tank 102 can have a housing 106 defining an internal aeration compartment 108. Water inlet 109 in a side wall of the housing 106 near the top of the aeration tank 102 can provide raw water to the aeration tank 102, with a high flow rate for the water in the range of between 5 gal/min and 8 gal/min. An internal water distribution pipe 110 can extend from the water inlet 109 into the aeration tank 102 in a substantially horizontally manner across a portion of the internal aeration compartment 108. Perforations/holes 111 in the internal water distribution pipe 110 can be positioned at various points along the length of the internal water distribution pipe 110 and can allow water flow out of the internal water distribution pipe 110 into the aeration compartment 108.

Multiple aeration plates 112 arranged at various heights inside the aeration compartment 108 can facilitate aeration of the liquid in the aeration tank 102. In general, each aeration plate 112 is perforated by multiple openings and configured to agitate and enhance aeration or the mixing of the flowing fluids (e.g., water and air) inside the aeration compartment 108. In this regard, each aeration plate 112 generally has a plurality of openings or passages allowing fluid to flow (typically water in one direction (e.g., down) and air in the opposite direction (e.g., up) through them. In an exemplary implementation, at least some of these openings or passages through the aeration plates 112 can be configured to impose a crisscross type of flow pattern in the passing fluids and aerating airflow.

In the illustrated implementation, each aeration plate 112 can extend completely across the aeration compartment 108 from side to side, so that all of the flowing fluid has to pass through at least one opening or passage in each aeration plate 112. In the illustrated implementation, the aeration tank 102 has five, evenly-separated aeration plates 112, but, of course, other implementations can have more or fewer aeration plates and they may or may not be evenly spaced.

An internal base 114 can be located at the bottom of the aeration compartment 108, and a drain pipe 116 can extend from an opening 118 in the internal base 114 to an aerated water outlet 120 in a side wall of the aeration tank 103. In the illustrated implementation, the aerated water outlet 120 can be located in a lower portion of the aeration tank 102. An air inlet 122 in a side wall of the aeration tank 102 can supply an airflow to aerate the liquid.

In the illustrated implementation, the air inlet 122 can be connected, via an external air inlet pipe 166, to an external air blower 168. The air blower 168 can include virtually any kind of device that can be configured to urge or blow air into the aeration tank 102. In the illustrated implementation, the air inlet 122 can be above the aeration plates 112. However, in other implementations, the air inlet 122 can be below the aeration plates 112. An internal air delivery conduit 124 can extend from the air inlet 122 to an area inside the aeration chamber 108 below all of the aeration plates 112, where the conduit opens up, with a plurality of openings, to deliver air into a lower portion of the aeration chamber 108. More particularly, in the illustrated example, the air delivery conduit 124 extends from the air inlet 122 in a substantially horizontal and radial direction into the aeration chamber 108, then bends approximately 90 degrees in a downward manner, then extends through a series of openings in the aeration plates 112, then splits into a plurality of branches, each of which extends radially and horizontally outward in a different direction than any other branches, and each branch has an opening at a distal end thereof that allows air to flow out of the air delivery conduit 124 and into the aeration chamber 108.

A vent opening 125 can be formed in a top surface of the aeration chamber 102, with a vent pipe 126 attached thereto. In a typical implementation, the vent pipe 126 can extend from the vent opening 125 to somewhere outside the house where the system 100 is located.

The aerated water tank 104 can have a housing 128 that defines an internal aerated water storage compartment 130. The internal water storage compartment 130 can be generally configured to store water temporarily after it has been aerated (to remove the radon) and before it is delivered into house's water distribution system.

Aerated water inlet 132 can be positioned in a side wall of the housing 128 in an upper portion of the aerated water storage tank 104. In the illustrated implementation, the aerated water inlet 132 can be connected, via an aerated water transfer pipe 134, to the aerated water outlet 120 of the aeration tank 102. The system 100, therefore, can be configured such that aerated water can be transferred from the aerator tank 102 to the aerated water storage tank 104 via the aerated water transfer pipe 134.

In the illustrated implementation, a water outlet 136 can be formed in a top surface of the housing 128 of the aerated water storage tank 104. A water pump can be located inside the aerated water storage compartment 130. A water delivery pipe 140 can extend from the water pump 138 to the water outlet 136 through a portion of the aerated water storage compartment 130. There can be an external water delivery pipe 170 that extends from the water outlet 136 to a water pressure regulator 172, which can be located outside of and above the aerated water storage tank 104. The water pressure regulator 172 can be virtually any kind of device that can regulate water pressure in a water distribution system. In a typical implementation, the water pressure regulator can be an electronic water pressure regulator. Generally speaking, the aerated water pump 138 can be configured and operable to pump water from the aerated water storage compartment 130 to the house's water distribution system, via the water delivery pipe 140 and though the water outlet 136. Moreover, generally speaking, the water pressure regulator 172 can be configured and operable to regulate the pressure through the house's water distribution system.

In an embodiment, a system raw water inlet 142 in a side wall of the housing 128 of the aerated water storage tank 104 can deliver gas-contaminated liquid to aerator tank 102. Generally speaking, raw water (e.g., water from a well) can be delivered into the system 100 via an external water inlet pipe 144 connected to the raw water inlet 142. The internal water inlet pipe 144 can extend from the water inlet to a valve 148 located inside the aerated water storage compartment 130. The valve 148 can be configured and operable to control the flow of raw water into the system 100. The valve 148 can be virtually any kind of valve that is able to be automatically controlled, for example, in response to an electrical or mechanical control signal. In one exemplary implementation, the valve 148 can be a solenoid valve. There is a raw water outlet pipe 150 that extends from the valve 148 to a raw water transfer outlet 152, which, in the illustrated example, is formed in the top surface of the housing 128 of the aerated water storage tank 104.

In the illustrated implementation, the raw water transfer outlet 152 can be connected, via a raw water transfer pipe 154, to the raw water inlet 109 of the aeration tank 102. The system 100, therefore, is configured such that raw water can be transferred from the aerated water storage tank 104 to the aerator tank 102 via the raw water transfer pipe 154.

In the illustrated implementation, the valve 148 can be controlled by a differential float system 156. The differential float system 156 can be placed inside the aerated water storage compartment 130.

The differential float system 156 in the illustrated implementation can use float 158 configured to move or slide up or down a line 160 depending on the fluid level in the aerated water storage compartment 130 between an upper stop 162 and a lower stop 164. Generally speaking, in a typical implementation, the differential float system 156 can operate to cause the valve 148 to open when the float 158 contacts the lower stop 164, and to cause the valve 148 to close when the float 158 contacts the upper stop 162. In a typical implementation, the positions of the stops 162 and 164 along the line 160 may be adjustable, which can enable a human user to adjust the way that the differential float system 156 controls the openings and the closings of the valve 148. In a typical implementation, the differential float system 156 can be purely mechanical (i.e., it does not utilize or rely upon electricity at all to function as intended).

Electric control box 174 can be positioned on top of the aerated water storage tank 104. The electric control box 174 can be operably coupled to (see dashed lines) and configured to control the water pressure regulator 172 and the air blower 168.

During operation, raw water may be pumped from a well by a well pump to valve 148. If the fluid level in the aerated water storage tank 104 is sufficiently high (as determined by the differential float system 156), then the valve 148 can close to prevent the raw water from flowing through system 100. However, once the fluid level in the aerated water storage tank 104 drops to a predetermined level (as defined by the position of the lower stop 164 in the differential float system 156), the valve 148 can open to allow the raw water to flow through it and to the aerator tank 102.

The raw water can travel from the valve 148, through the raw water transfer pipe 154, to the raw water inlet 109 of the aeration tank 102, and into the internal water distribution pipe 110. The raw water can then flow or drip out of the holes 111 in the internal water distribution pipe 110 and into the upper portion of the aeration chamber 108, where it can begin to flow in a downward direction through the aeration chamber 108.

Meanwhile, the air blower 168 can operate to blow air (e.g., from the ambient environment) into the aerator tank 102. In this regard, the air blower 168 can blow an air flow through the air external air inlet pipe 166, through the internal air distribution conduit 124 and into the lower portion of the aeration chamber 108. The air then flows in an upward direction or bubble up through the water in the aeration chamber 108.

Thus, in the illustrated implementation, the water and the air flow past each other in opposite directions through the aeration chamber 108. At each aeration plate 112, the air and the water are agitated (e.g., by the contours of the openings or passages through those aeration plates 112) to ensure thorough mixing of the air and water and thorough aeration of the water. The aeration plates 112 are configured to create a crisscross relative motion of the water and air as each passes the other in the aeriation chambers 108 within aeration tank 202.

In a typical implementation, the mixing of the air and the water as they pass one another essentially removes radon from the water. The liberated radon is carried, along with the air, out of the system 100 through the vent 125 and vent pipe 126, which may extend to outside the house (e.g., above the roof) to harmlessly dissipate in the atmosphere. By the time the water reaches the bottom of the aeration tank 102 and the opening 118 in the base 114, the water is at least substantially free of radon.

The now substantially radon-free ("aerated") water can flow out of the aeration tank 102 via the aerated water transfer pipe 134, and settles, temporarily at least, in the aerated water storage compartment 130 of the aerated water storage tank 104.

The water pump 138 inside the aerated water storage compartment 130 can operate to pump water out of the aerated water storage compartment 130 to the house's water distribution system, and the water pressure regulator 172 can operate to regulate the water pressure in that system. Aeriation can continue for a pre-set period after water flow ceases.

FIG. 2 depicts a schematic diagram of a single-tank system 200 configured to remove radon from water supplied, for example, from a well into a house, in a single compartment system. Gas removing system 200 depicted uses one tank; that being an aeration tank 202 supplying a liquid distribution system of gas-free liquid/fluid In general terms in an embodiment, the aeration tank 202 is configured to aerate water for purposes of removing radon (or other gases), and the aeration tank 202 can be configured to temporarily store water after radon removal before pumping into a water distribution system.

The aeration tank 202 can include an internal aeration compartment 208 defined by the interior of the aeration tank 202. Water supply pipe 254 at the top of aeration tank 202 provides raw water to the aeration tank 202 through a water inlet 209, with a high flow rate for the water in the range of between 5 gal/min and 8 gal/min. Water is distributed from the water inlet 209 into the aeration tank 202 through an internal water distribution attachment 210, which can include a spray nozzle or other appliance with multiple perforations.

Multiple aeration plates 212 can be arranged at various heights inside the aeration compartment 208 to facilitate aeriation of the liquid in the aeration tank 202. In general, each aeration plate 212 can be formed from a plastic plate perforated by multiple openings and configured to agitate and enhance aeration or the mixing of the flowing fluids (e.g., water and air) inside the aeration compartments 208. In this regard, each aeration plate 212 generally has a plurality of openings or passages allowing fluid to flow (typically water in one direction (e.g., down) and air in the opposite direction (e.g., up) through them.

In an exemplary embodiment, at least some of these openings or passages through the aeration plates 212 are configured to impose a crisscross type of flow pattern in the passing fluids and aerating airflow. The crisscross motion of the flowing fluid and air can enhance separation of any contaminating gases, such as radon.

In an embodiment, each aeration plate 212 extends completely across the aeration compartment 208 from side to side, substantial covering the circular area of the aeration tank 202, so that all of the flowing fluid must pass through at least one opening or passage in each aeration plate 212. In the illustrated implementation, the aeration tank 202 has two aeration plates 212, but, of course, other implementations can have more or fewer aeration plates and they may or may not be evenly spaced.

In an embodiment, an internal air delivery conduit 224 can extend from the air inlet 222 near the top of aeration tank 202 to provide airflow to an area inside the aeration chamber 208 defined by air perforations 223 in air delivery conduit 224 below all of the aeration plates 212, where the conduit opens up, with a plurality of perforations 223 delivering an airflow into the aeriation tank 202.

As depicted, the air inlet 222 can be connected, via an external air inlet pipe 266, to an external air blower 268. An adjustment valve 267 can be used to adjust airflow through air inlet 222. The air blower 268 can include virtually any kind of device that can be configured to urge or blow air into the aeration tank 202. In the illustrated implementation, the air inlet 222 can be above the aeration plates 212. However, in other implementations, the air inlet 222 can be below the aeration plates 212. An internal air delivery conduit 224 can extend from the air inlet 222 to an area inside the aeration chamber 208 below all of the aeration plates 212, where the conduit opens up, with a plurality of openings, to deliver air into a lower portion of the aeration chamber 208. More particularly, in the illustrated example, the air delivery conduit 224 extends from the air inlet 222 in a substantially horizontal and radial direction above the aeration chamber 208, then bends approximately 90 degrees in a downward manner, then extends through a series of openings in the aeration plates 212 to terminate at the distal end at the bottom of aeration tank 202 in the aeration chamber 208.

A vent opening 225 can be formed in a top surface of the aeration chamber 202, with a vent pipe 226 attached thereto. In a typical implementation, the vent pipe 226 can extend from the vent opening 225 to somewhere outside the house where the system 200 is located and facilitates the venting of separated gases, such as radon, into the atmosphere. The vent pipe 226 can include a valve 227, which can comprise an automatic vent valve to control gas pressure inside aeration tank 202.

The system 200 can be configured such that aerated water can be aerated and stored in aeration tank 202.

In the illustrated implementation, a water outlet 272 can be formed in the side of the aeration tank 202. A water pump 238, such as a, water well pump can be located inside the aeration tank 202. Water pump 238 can be positioned so as to pump aerated water from the interior of aeration tank 238 to an external water delivery pipe 270 that extends from the water outlet 272. Water outlet 272 can further comprise a water valve or regulator used to regulate pressure inside aeriation tank 202. A water pressure regulator comprising water outlet 272 can be virtually any kind of device that can regulate water pressure in a water distribution system, such as a valve. In a typical implementation, the water pressure regulator can be an electronic water pressure regulator. Generally speaking, the aerated water pump 238 can be configured and operable to pump aerated water from the aeration tank 202 to a home water distribution system, via the water delivery pipe 270. Moreover, generally speaking, the water pressure regulator 272 and water pump 238 can be configured and operable to regulate the pressure in the home water distribution system.

In an embodiment, a system raw gas-contaminated water inflow can flow into water aeration tank 202 and delivered into the system 200 via external water inlet pipe 244. The internal water inlet pipe 244 can extend to a valve 248 at the wall of aerated tank 202. Valve 248 can be configured and operable to control the flow of raw water into the system 200. Valve 248 can be virtually any kind of valve that is able to be automatically controlled, for example, in response to an electrical or mechanical control signal. In one exemplary implementation, the valve 248 can be a solenoid valve. Water transfer pipe 254 can extend from valve 248 to a water inlet 209.

In an embodiment such as depicted, valve 248 can be controlled by a differential float system 256. The differential float system 256 can be placed inside the aeration tank 202. The differential float system 256 can use float 258 configured to move or slide up or down a line 260 depending on the fluid level in the aeration tank 202 between an upper stop 262 and a lower stop 264. Generally speaking, in a typical implementation, the differential float system 256 can operate to cause the valve 248 to open when the float 258 contacts the lower stop 264, and to cause valve 248 to close when the float 258 contacts the upper stop 262. In a typical implementation, the positions of the stops 262 and 264 along the line 260 may be adjustable, which can enable a human user to adjust the way that the differential float system 256 controls the openings and the closings of the valve 248. In a typical implementation, the differential float system 256 can be purely mechanical (i.e., it does not utilize or rely upon electricity at all to function as intended). In an embodiment, differential float system 256 can further be configured to control operation of system 200, operating to turn on air blower 268 and pump 238, and controlling valve/regulator 272.

During operation, raw water may be pumped from a well by a well pump to valve 248. If the fluid level in the aeration tank 202 is sufficiently high (as determined by the differential float system 256), then the valve 248 can close to prevent the raw water from flowing through system 200. However, once the fluid level in the aeration tank 202 drops to a predetermined level (as defined by the position of the lower stop 264 in the differential float system 256), the valve 248 can open to allow the raw water to flow through it and to the aerator tank 202.

The raw water can travel from the valve 248, through the raw water transfer pipe 254, to the raw water inlet 209 of the aeration tank 202, and into the internal water distribution pipe 210. The raw water can then flow into the upper portion of the aeration chamber 208, where it can begin to flow in a downward direction through the aeration chamber 208.

Meanwhile, the air blower 268 can operate to blow air (e.g., from the ambient environment) into the aerator tank 202. In this regard, the air blower 268 can blow an air flow through the air external air inlet pipe 266, through the internal air distribution conduit 224 and into the lower portion of the aeration chamber 208. The air then flows in an upward direction or bubble up from the bottom through the water in the aeration chamber 208.

Thus, in the illustrated implementation, the water and the air flow past each other in opposite directions through the aeration chamber 208. At each aeration plate 212, the air and the water are agitated (e.g., by the contours of the openings or passages through those aeration plates 212) to ensure thorough mixing of the air and water and thorough aeration of the water. The aeration plates 212 are configured to create a crisscross relative motion of the water and air as each passes the other in the aeration chambers 208 within aeration tank 202.

In a typical embodiment, the mixing of the air and the water as they pass one another essentially removes radon from the water. The extracted radon is carried, along with the air, out of the system 200 through the vent 225 and vent pipe 226, which may extend to outside the house (e.g., above the roof) to harmlessly dissipate in the atmosphere. By the time the water reaches the bottom of the aeration tank 202 and the inlet of pump 238, the water is at least substantially free of radon.

The now substantially radon-free ("aerated") water can flow out of the aeration tank 202 via the external water delivery pipe 270 and into the home water distribution system. The water pump 238 inside the aeration tank 202 can operate to pump water out of the aeration tank 202 to the house's water distribution system, and the water pressure regulator 272 can operate to regulate water pressure in that system.

Aeration can continue for a pre-set period after water flow ceases.

Thus, in an embodiment, the following steps can occur:

1) radon-contaminated water enters a drum via a level differential valve;

2) the water then flows thru a spray nozzle to maximize separation of radon gas from water by mixing with an air flow;

3) air enters the bottom of the drum via an air blower to be aerated with the water to extract the radon;

4) extracted radon gas is vented outside the building via a 2" vent line;

5) as the water enter the drum, a flow switch starts the air blower, and when the tank is full, the blower turns off after a pre-set period of time; and 6) a borehole pump re-pressurizes the water back into the house via electronic pressure control valve.

A number of embodiments of the invention have been described. Nevertheless, it will be understood that various modifications may be made without departing from the spirit and scope of the invention.

For example, the illustrated system can be part of a larger water treatment system that can address other water treatment issues. Additionally, other components (e.g., meters, control devices, etc.) can be incorporated into the system(s) disclosed herein.

The relative and sizes, shapes, and configurations of the various system components, including, for example, the aeration tank 102 and 202, and the aerated water storage tank 104 can be varied in any number of possible ways.

Although crisscross type of flow pattern is mentioned herein other types of flow patterns are possible as well.

Other implementations are within the scope of this application.

Generally speaking, any relative terminology used herein, such as "upper", "lower", "above", "below", "front", "rear," etc. is solely for the purposes of clarity and is not intended to limit the scope of what is described here to require particular positions and/or orientations. Accordingly, such relative terminology should not be construed to limit the scope of the present application container.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:

1. A system for removing a gas from a liquid comprising:
   an aeration tank for aerating a raw liquid containing a gas so as to remove the gas by causing an agitated air flow through the raw liquid;
   a plurality of aeration plates placed substantially horizontally across a horizontal cross sectional plane of the aeration tank, the plurality of aeration plates being perforated by a plurality of openings;
   wherein aerating the raw liquid occurs with the raw liquid flowing downward into the aeration tank, and the agitated air flowing upward through the raw liquid from a point proximate to a bottom of the aeration tank, wherein the plurality of aeration plates are configured to impart a crisscross movement pattern in the raw liquid flowing downward and the agitated air flowing upward as each passes the other to agitate and mix the liquid and the agitated air;
   a raw liquid input valve configured to control a flow of the raw liquid into the system;
   a differential float system inside the aeration tank configured to control the raw liquid input valve;
   wherein the differential float system comprises a float, a line, an upper stop and a lower stop, the float, the upper stop and the lower stop are connected with the line, the float is located in between the upper stop and the lower stop, the float is movable along the line, a position of each of the upper stop and the lower stop along the line is adjustable, the float is configured to move or slide up or down the line depending on a level of the raw liquid in the aeration tank between the upper stop and the lower stop;
   wherein the differential float system operates to open the raw liquid input valve when the float contacts the lower stop and operates to close the raw liquid input valve when the float contacts the upper stop;
   wherein the aeration tank comprises a pry-off lid providing access for maintenance;
   a liquid supply pipe in fluid communication with the raw liquid input valve;
   a liquid inlet in fluid communication with the liquid supply pipe;
   a spray nozzle in fluid communication with the liquid inlet and located within the aeration tank;
   in response to the raw liquid input valve being open, the raw liquid flowing through the liquid supply pipe and the liquid inlet and then being sprayed into the aeration tank via the spray nozzle, so as to separate the gas from the raw liquid;
   a pump;
   the pump being located inside the aeration tank; and
   the pump and the differential float system each traversing through the plurality of aeration plates.

2. The system of claim 1, wherein the liquid comprises water and the gas comprises radon.

\* \* \* \* \*